Nov. 3, 1925.

Re. 16,198

J. L. PETERSON

CURTAIN FASTENER

Original Filed June 26, 1922

Inventor:
John L. Peterson,
by Fenning, Stoltz, Fenning & Hodges
Attys

Reissued Nov. 3, 1925. Re. 16,198

UNITED STATES PATENT OFFICE.

JOHN L. PETERSON, OF GRAND RAPIDS, MICHIGAN, ASSIGNOR TO CARR FASTENER COMPANY, OF CAMBRIDGE, MASSACHUSETTS, A CORPORATION OF MAINE.

CURTAIN FASTENER.

Original No. 1,471,570, dated October 23, 1923, Serial No. 570,828, filed June 26, 1922. Application for reissue filed June 25, 1925. Serial No. 39,612.

*To all whom it may concern:*

Be it known that I, JOHN L. PETERSON, a citizen of the United States of America, residing at Grand Rapids, in the county of Kent and State of Michigan, have invented certain new and useful Improvements in Curtain Fasteners; and I do hereby declare the following to be a full, clear, and exact description of the invention, such as will enable others skilled in the art to which it appertains to make and use the same.

This invention relates to a fastener, particularly adapted for use with curtains of motor vehicles, though not in any sense limited thereto. It is a primary object and purpose of the present invention to provide a fastener of the character indicated which may be instantly applied to and connected with a suitable pin permanently secured to the body of the vehicle, the top bows or other parts to which the curtains are connected, and further provide the fastener with means for instantly disengaging the same from the pin by manual operation whenever the curtain is to be detached. The attachment of curtains by means of fasteners is well known, but such fasteners as are commonly used are more or less defective, being hard to detach with the result that they are frequently torn from the curtains or broken and made defective. With the fastener which I have devised, the detachment is very easy, can be done instantly and with no danger of breakage or tearing from the curtain, and at the same time the fastener in use securely holds the curtain in place when attached. A further feature of the fastener of my invention is that the pin to which it is applied may be more or less concealed or located in a depression in the vehicle body or other part to which connected so that there is not projection of the pins with a resultant danger of tearing of clothing catching on the same. These features of advantage, as well as many others not at this time specifically enumerated will appear fully and in detail as understanding of the invention is had from the following description, taken in connection with the accompanying drawing, in which, Fig. 1 is a vertical section through the fastener and adjacent portion of the curtain to which attached, showing the same in operative engagement with a pin carried by the vehicle body;

Like reference characters refer to like parts in the several figures of the drawing.

Figure 1:
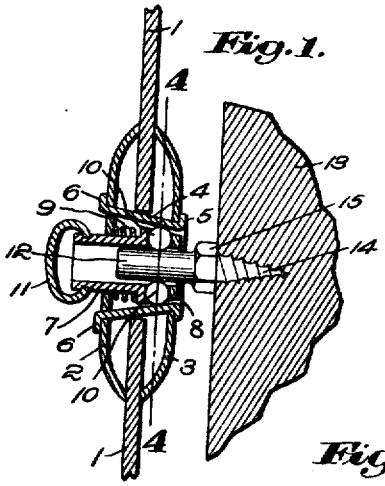

Attached to the curtain 1 at desired places are two clamping members 2 and 3 of sheet metal, preferably of oval shape, though not necessarily so, one of the members 2 being located on the outer side of the curtain and the other on the inner side. A tapered sleeve 4 is used to connect the clamping members together and clamp the same at their edges against the curtain. The sleeve passes through the curtain and has an end passing through an opening in the member 3 which is then turned outwardly to make an annular lip 5 bearing against member 3 around the opening. At the opposite end of the sleeve tongues 6 pass through openings in the member 2 and are clinched over against the outer side of the member, whereby a secure and permanent connection to the curtain is provided.

A sleeve 7 formed at its inner end with an enlarged tapered head 8 is loosely mounted within the tapered sleeve 4, extending outwardly at its outer end through an opening in the member 2, a spring 9 is located around the sleeve 7 between the head 8 thereof and the member 2, the tendency of the spring being to move the sleeve 7 inwardly. A number of recesses to receive small balls 10 are made in the outer sides of the head 8, and it is apparent that in the normal inner position of the sleeve 7 and head 8, under the influence of the spring 9, the balls are projected inwardly so that at their inner sides they extend into the passage or opening through the sleeve 7. An operating head 11 of sheet metal is secured to the outer end of said sleeve 7. By grasping the same and drawing outwardly thereon, the sleeve and head may be moved outwardly with a compression of spring 9, as is evident.

The fastener connected to the curtain as thus described is adapted to have connection with a pin secured to any relatively secure support. The pin 12 may be secured to the body 13 of a vehicle, or to the top bows thereof, a screw 14 entering the body until stopped by the enlargement 15 made between the pin 12 and the screw.

Figure 2:
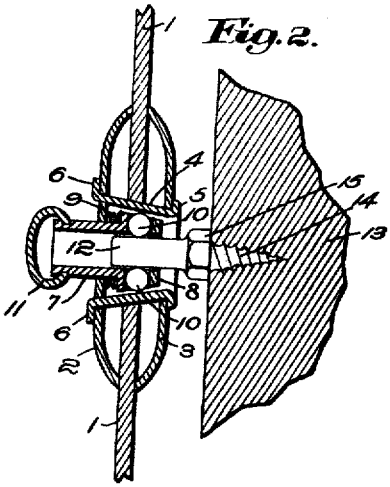
Fig. 2 is a like view showing the fastener operated to its disengaging position with respect to the pin.
Figure 3:
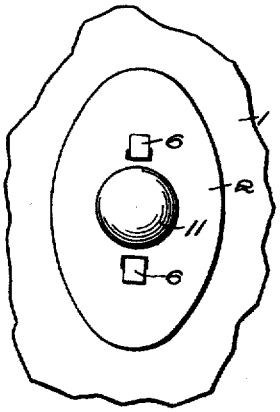
Fig. 3 is a front elevation of the fastener.

The fastener is instantly applied to the pin by merely placing the same over the pin. The pin enters the inner end of the sleeve, passing through the head 8 and the balls 10 bear against the sides of the pin. When thus connected together, the pin is held by the balls from movement out of the sleeve, as any attempted movement serves to tend to draw the sleeve 7 and head 8 inwardly with a forcing of the balls inwardly more strongly against the pin due to the tapered sides of the sleeves 4 tending to move the balls inwardly. The curtain, accordingly is securely held against detachment. The detachment is effected by grasping the head 11 and pulling outwardly thereon, as shown in Fig. 2, whereupon the sleeve 7, head 8 and balls 9 carried thereby are moved so as to bring the balls away from the sleeve 4 leaving space for their outward movement toward such sleeve and freeing them from the pin 12 which they normally grip.

Figure 5:
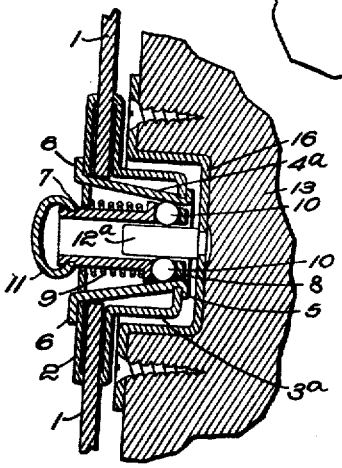
Fig. 5 is a view, similar to that shown in Fig. 1, of a modified form of construction wherein the pin is more or less concealed.
Figure 4:
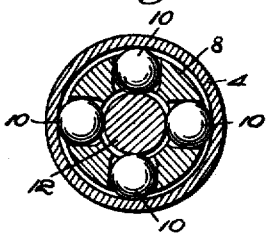
Fig. 4 is a transverse vertical section, taken substantially on the plane of line 4—4, of Fig. 1.

In Fig. 5, a modification in structure is shown for setting the pin $12^a$ in a recess so that it does not project beyond the surface of the support on which it is fixed. In this construction, a cup-like member 16 of sheet metal is set in the body 13 which has a countersunk depression to receive the member 16, the pin $12^a$ being secured substantially centrally in the recess of said member 16 and extending outwardly so that its outer end comes substantially flush with the outer sides of the member. The sleeve $4^a$ is longer in this construction and the inner clamping member $3^a$ is formed with a centrally located inwardly extending portion adapted to enter the member 16 when the fastener is connected with the pin $12^a$, as shown in Fig. 5. The outer clamping member $2^a$ may be flat, as shown. Necessarily, the sleeve 7 is longer and the spring 9 may be longer. The action with respect to connection of the fastener with the pin is the same as that previously described with reference to the construction shown in Figs. 1 to 4 inclusive.

This construction is particularly effective in connection with curtains for vehicles which are designed for detachable connection to the vehicles, the attachment being very easy and practically instantaneous, and secure except when the head 11 is grasped to effect detachment, whereupon the detachment occurs very readily without possibility of injuring the curtain, the pin or the fastener used therewith. The balls 10 are normally pressed into gripping engagement with the pin 12 or $12^a$, and continue to exert a gripping action at all times except when the same are moved to the position shown in Fig. 2, on manual withdrawal of the sleeve 7 and movement of the balls associated therewith. The construction is economical to make, is durable and is efficient in every way for the purposes it is adapted to fulfill. Of course, there are other places of use of the construction, and I do not wish to be limited with respect thereto but consider myself entitled to all forms of construction and the uses to which the same may be put, covered in the appended claims defining the invention.

Claims:

1. In combination with a supporting structure, a pin attached thereto, a curtain, a fastener connected with the curtain, including clamping members, one on each side of the curtain, means fastening the clamping members together and clamping the same against the curtain, spring acuated gripping means located within the said means used to fasten the clamping members together and adapted to be placed over said pin to grip the same, and means for manually operating said gripping means to release the same from the pin, substantially as described.

2. In combination, a pin, means for carrying the same, a fastener including a tapered sleeve, a second sleeve loosely extending into the first sleeve, said second sleeve having a tapered head thereon, balls carried in the head and adapted to be moved inwardly by engagement with the tapered sleeve, spring means normally moving the second sleeve inwardly to effect the inward movement of the balls to engage with the pin when entered into said second sleeve, manually operable means for moving the second sleeve and head outwardly to free the balls from gripping engagement with the pin, a curtain through which said first sleeve passes, two claming members located one at each end of the said first sleeve and one at each side of the curtain, and means for securing the clamping plates against outward movement with respect to the ends of said first sleeve to bind the same against opposite sides of the curtain substantially as described.

3. In combination, a support, a cup-shaped member set into said support, a pin attached to said member at the inner side thereof and extending outwardly, a curtain, a fastener attached to the curtain having means adapted to enter into said member and provided with automatically acting gripping means for gripping the pin, and manually operable means for releasing said gripping means.

4. In combination, a support, a pin attached thereto, a curtain, a fastener comprising two clamping members located one at each side of the curtain, a tapered sleeve passing through the curtain and securing the clamping members together and against opposite sides of the curtain, a second sleeve formed with an enlarged tapered head passing loosely through the outer clamping member into the first sleeve, said head having a plurality of recesses through its sides, a ball loosely seated in each recess, a spring under compression around the second sleeve between the head and the outer clamping member, and a head attached to the outer end of said second sleeve.

5. A separable fastener installation comprising, in combination, a stud unit countersunk into a rigid stud-carrying support so that the head thereof is substantially flush with the face of the support, a cooperating socket attached to a socket-carrying medium and presenting automatically acting means for engagement with said stud and manually operable means for releasing said automatically acting means to permit separation of the fastener.

6. A separable fastener installation comprising, in combination, a stud including a casing countersunk into a rigid support, a socket-engaging member secured in said casing, a socket secured to a socket-carrying medium and including gripping means for engagement with said socket-engaging member, means for locking said socket with said stud and manually operable means for releasing said locking means to permit separation of the socket from the stud.

7. A separable fastener installation comprising, in combination, a stud countersunk into a rigid support so that the head thereof is substantially flush with the face of the support, a cooperating socket attached to a socket-carrying medium and presenting automatically acting means to engage and lock the stud with said socket, said socket being constructed so that a force applied to a selected part thereof permits release of such engagement and separation of the stud and socket.

8. In combination, a rigid element having a recess therein, a male member secured to the bottom of said recess inwardly of the outer face of said element and a member such as a curtain having a socket provided with a part which may enter said recess and there connect to said male member to secure said curtain to said rigid element.

9. A flush type separable fastener installation including a casing countersunk in a rigid stud-carrying support, a stud part presented within said casing and having its outer end substantially flush with the outer end of said casing and means for securing said casing to the support.

10. A separable fastener installation comprising, in combination, a casing countersunk in a rigid support, means for securing said casing thereto and a socket-engaging stud part secured to said casing and surrounded thereby, said stud part having its outer end located in substantially the same plane as the outer end of said casing.

11. A flush type separable fastener installation including a socket-retaining part countersunk into a recess in a rigid support and means for securing said socket-retaining part to said support and having its outer end located in substantially the same plane as the outer face of the support.

In testimony whereof, I have hereunto subscribed my name this 5th day of June, 1925.

JOHN L. PETERSON.

Certificate of Correction.

It is hereby certified that in Reissue Letters Patent No. 16,198, granted November 3, 1925, upon the application of John L. Peterson, of Grand Rapids, Michigan, for an improvement in "Curtain Fasteners," errors appear in the printed specification requiring correction as follows: Page 2, line 115, claim 2, for the misspelled word "claming" read *clamping;* page 3, lines 79 and 80, claim 11, strike out the clause "and means for securing said socket-retaining part to said support" and insert the same to follow after the word "support" and before the period at the end of the claim; and that the said Letters Patent should be read with these corrections therein that the same may conform to the record of the case in the Patent Office.

Signed and sealed this 8th day of December, A. D. 1925.

[SEAL.]

WM. A. KINNAN,
*Acting Commissioner of Patents.*